US012244079B1

(12) United States Patent
Long et al.

(10) Patent No.: US 12,244,079 B1
(45) Date of Patent: Mar. 4, 2025

(54) CIRCULARLY POLARIZED SOLDERLESS ANTENNA WITH FREQUENCY-SCALABLE CIRCUIT

(71) Applicant: United States of America as represented by the Administrator of NASA, Washington, DC (US)

(72) Inventors: Justin Long, Greenbelt, MD (US); Victor Marrero-Fontanez, Greenbelt, MD (US); Wei-Chung Huang, College Park, MD (US); Cornelis Du Toit, Ellicott City, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 221 days.

(21) Appl. No.: 17/941,288

(22) Filed: Sep. 9, 2022

(51) Int. Cl.
*H01Q 9/04* (2006.01)

(52) U.S. Cl.
CPC ............. *H01Q 9/0414* (2013.01); *H01Q 9/04* (2013.01); *H01Q 9/0421* (2013.01)

(58) Field of Classification Search
CPC ....... H01Q 9/0414; H01Q 9/0421; H01Q 9/04
See application file for complete search history.

(56) References Cited

U.S. PATENT DOCUMENTS

2013/0050048 A1* 2/2013 Green .................... H01Q 23/00 343/860
2014/0145891 A1* 5/2014 Palevsky ............. H01Q 9/0435 343/746

* cited by examiner

*Primary Examiner* — Hai V Tran
(74) *Attorney, Agent, or Firm* — Christopher O. Edwards; Matthew F. Johnston; Trenton J. Roche

(57) ABSTRACT

A solderless antenna includes a pair of spaced-apart electrically-conductive disks arranged in a vertical stack and a self-supporting, branched-path feed circuit. The feed circuit has a signal-receiving point and four signal paths leading to four excitation points. The first signal path is the shortest. The second signal path includes a portion of the first signal path and is longer than the first signal path. The third signal path is unique with respect to the first signal path and second signal path, and is longer than the second signal path. The fourth signal path includes a portion of the third signal path and is longer than the third signal path.

6 Claims, 4 Drawing Sheets

CIRCULARLY POLARIZED SOLDERLESS ANTENNA WITH FREQUENCY-SCALABLE CIRCUIT

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to antennas. More specifically, the invention is a circularly polarized antenna having a solderless and frequency-scalable all-metal feed circuit suitable for use in harsh environments.

2. Description of the Related Art

Microwave signals are frequently transmitted using circular polarization. For example, a rotating electric field can be created by a feed network connected to one or more antenna patches. The feed network has a plurality of spaced-apart excitation points with the transmitting signal being fed sequentially to the excitation points in a rotating fashion.

Feed networks are typically constructed from microstrip transmission lines (also referred to as “circuits”) that are fabricated from narrow strips of conductive materials disposed on a dielectric substrate. Solder is used to connect the transmission lines to a ground plane and the various feed points. Unfortunately, these types of feed networks can fail when the solder joints are damaged after being exposed to extreme heat, cold, corrosive, and/or vibrating environments, all of which are generally encountered in space applications.

To address the drawbacks associated with solder-reliant feed networks, U.S. Pat. No. 8,912,974 discloses a solderless circularly-polarized microwave antenna element in which a non-planar all-metal feed circuit replaces the conventional microwave transmission line for signal transmission. The cylindrically-shaped circuit creates a single serialized path tuned to operate in the S-band of approximately 2 GHz. Unfortunately, this design does not lend itself to frequency scaling and is, therefore, not suitable for use in the X-band (i.e., approximately 8 GHz) which is the communications frequency that will likely be used for future lunar and other space missions.

SUMMARY OF THE INVENTION

Accordingly, it is an object of the present invention to provide a solderless antenna for use in X-band communications.

Another object of the present invention is to provide an X-band antenna for use in harsh space environments.

Still another object of the present invention is to provide a frequency-scalable antenna for use in harsh environments.

Other objects and advantages of the present invention will become more obvious hereinafter in the specification and drawings.

In accordance with the present invention, an antenna includes a pair of spaced-apart electrically-conductive disks arranged in a vertical stack and a self-supporting, branched-path feed circuit. The feed circuit has a signal-receiving point, a first signal path from the signal-receiving point to a first excitation point, a second signal path from the signal-receiving point to a second excitation point, a third signal path from the signal-receiving point to a third excitation point, and a fourth signal path from the signal-receiving point to a fourth excitation point. The second signal path includes a portion of the first signal path and is longer than the first signal path. The third signal path is unique with respect to the first signal path and second signal path, and is longer than the second signal path. The fourth signal path includes a portion of the third signal path and is longer than the third signal path. When a microwave signal is supplied to the signal-receiving point, power of the microwave signal is equally divided and distributed firstly to the first excitation point, secondly to the second excitation point, thirdly to the third excitation point, and fourthly to the fourth excitation point.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
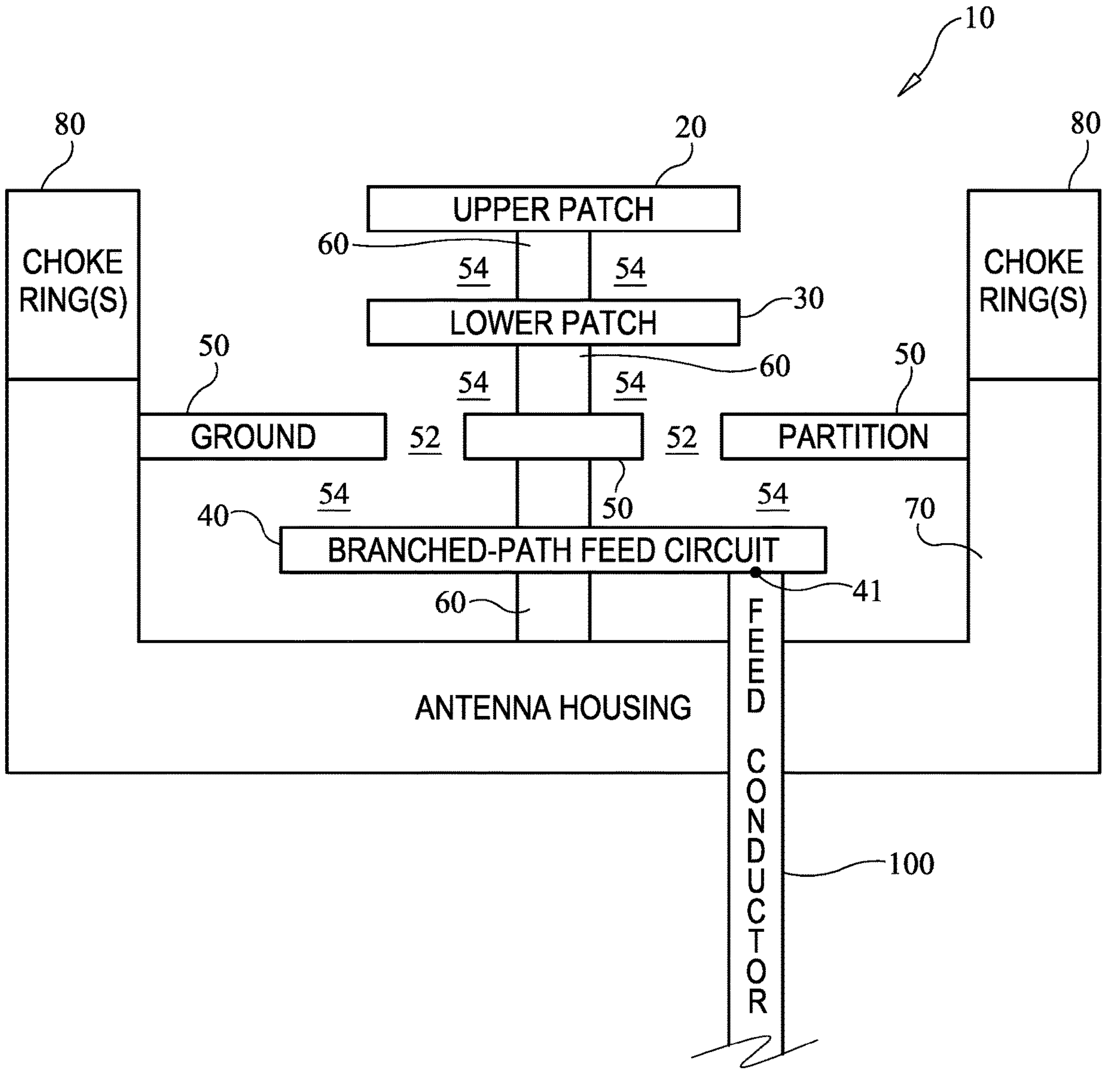
FIG. 1 is a schematic view of circularly polarized antenna having an all-metal, branched-path feed circuit in accordance with the present invention.

Referring now to the drawings and more particularly to FIG. 1, a schematic view of a circularly polarized antenna in accordance with the present invention is shown and is referenced generally by numeral 10. As will be explained further below, antenna 10 is a solderless antenna that includes an all-metal frequency-scalable feed circuit that is well-suited for applications that will be used in harsh environments.

Antenna 10 includes two antenna patches (e.g., an upper patch 20 and a lower patch 30) and a branched-path metal feed circuit 40 that circularly polarizes a signal supplied thereto as will be explained later herein. Antenna 10 also includes an electrically-conductive ground partition 50 disposed between and spaced apart from patch 30 and feed circuit 40. Ground partition 50 has a plurality of through holes or apertures 52, the function of which will be described later herein.

Patches 20 and 30 are electrically-conductive disks that are spaced apart from one another. Spatial regions 54 are defined between patches 20 and 30, between patch 30 and ground partition 50, and between ground partition 50 and feed circuit 40. Patches 20/30, ground partition 50, and feed circuit 40 are disposed in an environment that can be an air environment or a vacuum environment without departing from the scope of the present invention. The size, shape, and material used for patches 20/30 and ground partition 50 can be adapted for a particular application as would be understood in the art. In general, each of patches 20 and 30 is a self-supporting disk (i.e., can hold its shape without support of a substrate) that can be made from an electrically-conductive material having a relatively high stiffness to density ratio. All the electrically-conducting parts used in the present invention can be made of any suitable metal such as aluminum or a metal alloy such as brass, or even metal clad composite materials such as copper clad G10, Kevlar or carbon composite, without departing from the scope of the present invention.

Feed circuit 40 defines a plurality of electrically-conductive signal paths. Each signal path extends from a signal-receiving point 41 on feed circuit 40 to one of a plurality of signal excitation points (not illustrated in FIG. 1). Signals passing to or from signal-receiving point 41 are conducted via a feed conductor 100 that is not part of the present invention. Microwave signals are transferred between the excitation points of feed circuit 40 and patches 20/30 via apertures 52 in ground partition 50 as is well-understood in the art. As will be explained further below, feed circuit 40 is a unique branched-path design that is readily scaled for the frequency of operation of a particular application. Feed circuit 40 is an all-metal, self-supporting structure that is readily incorporated into a solderless antenna 10 thereby avoiding the pitfalls of conventional solder-reliant feed networks.

Patches 20/30, apertures 52, and branched-path feed circuit 40 provide the primary signal handling features of antenna 10. The remaining supporting features of antenna 10 can be configured in a variety of ways without departing from the scope of the present invention. In general, the supporting features include ground partition 50 that can be coupled to an antenna housing 70, a patch-and-circuit support 60, antenna housing 70, and one or more choke rings 80. Patch-and-circuit support 60 provides the mechanical coupling of patches 20/30 and feed circuit 40 to antenna housing 70 as well as providing for the establishment of spatial regions 54. In some embodiments of the present invention, patch-and-circuit support 60 can be a rigid post made from an electrically-conductive material that is electrically coupled to each of patches 20/30 and feed circuit 40. When configured in this fashion, patch-and-circuit support 60 can also serve as a common electrical ground potential for antenna 10.

Antenna housing 70 provides a support structure for all the electrical and mechanical elements of antenna 10. In some embodiments of the present invention, antenna housing 70 is made from a rigid and electrically-conductive material (e.g., metal, composites, etc.). The particular configuration of antenna housing 70 is not a limitation of the present invention. Electrically insulating spacers (not shown) can be used to maintain circuit alignment within housing 70 and to prevent unwanted electrical contact between any elements of antenna 10 as would be well-understood in the art.

The one or more choke rings 80 are mounted on antenna housing 70. The one or more choke rings 80 are typically made from metal and can be configured in a variety of ways to reject any unwanted signals/frequencies in ways well-known in the art. Accordingly, the type, number, size, shape, etc., of choke rings 80 are not limitations of the present invention.

Figure 2:
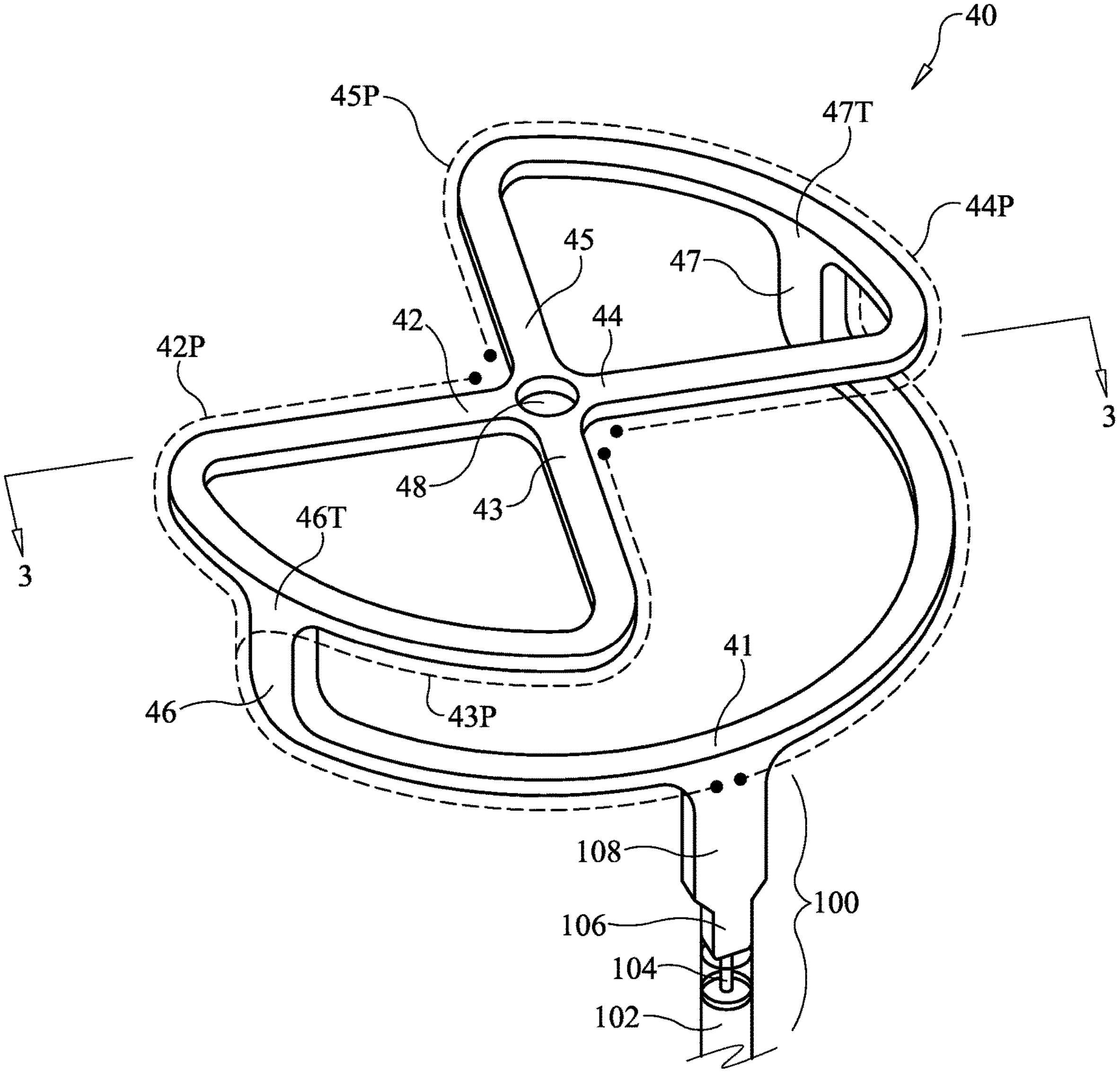
FIG. 2 is an isolated perspective view of an all-metal, branched-path feed circuit in accordance with an embodiment of the present invention.

Branched-path feed circuit 40 can be constructed in a variety of planar and non-planar configurations without departing from the scope of the present invention. By way of an illustrative example, FIG. 2 presents an isolated perspective view of a non-planar branched-path feed circuit 40 for use in an antenna of the present invention. An exemplary feed conductor 100 is shown coupled to feed circuit 40 at its signal-receiving point 41. Feed conductor 100 can include a coaxial cable 102 having a central conductor (not shown), an electrically-conductive pin 104 for making electrical contact with the coaxial cable's central conductor, an electrical-conductive pin-to-transformer transition section 106 in electrical contact with pin 104, and an electrically-conductive impedance-matching transformer section 108 in electrical contact with transition section 106 and signal-receiving point 41. Such feed conductor constructions are well-known in the art.

In the FIG. 2 embodiment, feed circuit 40 is a self-supporting electrically-conductive structure defining a plurality of signal paths or branches of increasing path length between its signal-receiving point 41 and each of four excitation points 42, 43, 44 and 45. The first and shortest path (indicated by a dashed line path segment referenced by numeral 42P) traverses from signal-receiving point 41 to excitation point 42 where path 42P includes an impedance-matching transformer 46. The second path (indicated by a dashed line path segment referenced by numeral 43P) is longer than path 42P and traverses from signal receiving point 41 to excitation point 43 that also includes impedance-matching transformer 46. That is, second path 43P includes the portion of first path 42P that extends from signal-receiving point 41 to the T-junction 46T of transformer 46. The third path (indicated by a dashed line path segment referenced by numeral 44P) is longer than path 43P and traverses from signal-receiving point 41 to excitation point 44 where path 44P includes an impedance-matching transformer 47. Third path 44P does not share any common portion with first path 42P and second path 43P. The fourth and longest path (indicated by a dashed line path segment referenced by numeral 45P) traverses from signal receiving point 41 to excitation point 45 that also includes impedance-matching transformer 47. That is, fourth path 45P includes the portion of third path 44P that extends from signal-receiving point 41 to the T-junction 47T of transformer 47.

Excitation points 42-45 are short sections of the corresponding paths 42P-45P that are aligned with (i.e., over) apertures 52 in ground partition 50 (FIG. 1). Apertures 52 provide for the electromagnetic coupling between the excitation points 42-45 and patches 20/30, as is well-understood in the art. Apertures 52 can be four separate openings or slots cut through ground partition 50, or can be combined as a single crossed slot with patch-and-circuit support 60 extending through the crossing point without touching ground partition 50. Coupling between the excitation points 42-45 and patches 20/30 can be achieved in a variety of ways without departing from the scope of the present invention. For example, a conductive path structure can be used to carry microwave signals from the excitation points 42-45, through the apertures 52, and to patches 20/30.

In an embodiment of the present invention, the lengths of the four signal paths and the positions of the four excitation points are configured to be matched in terms of their phase lag angle and their physical angle of separation. For example, a phase lag angle of 90° and a physical angle of 90° between adjacent ones of excitation points 42-45 are achieved by configuring feed circuit 40 as follows:

Let the length of first path 42P from signal-receiving point 41 to excitation point 42 be defined as "L";

The length of second path 43P from signal-receiving point 41 to excitation point 43 is configured to be (L+λ/4), where A is the wavelength of the desired frequency of operation;

The length of third path 44P from signal-receiving point 41 to excitation point 44 is configured to be (L+λ/2);

The length of fourth path 45P from signal-receiving point 41 to excitation point 45 is configured to be (L+3λ/4); and Each of excitation points 42-45 is physically spaced from adjacent excitation points by an angle of 90° as dictated by the configuration of feed circuit 40 at the excitation points.

By virtue of the above-described configuration, a signal originating at signal-receiving point 41 is distributed evenly between excitation points 42-45 such that the signal magnitude is the same at each of excitation points 42-45. However, the above-described path length differences create a 90° phase lag between excitation points 42 and 43, another 90° phase lag between excitation points 43 and 44 or a 180° phase lag between excitation points 42 and 44, and another 90° phase lag between excitation points 44 and 45 or a 270° phase lag between excitation points 42 and 45. The result is that a signal originating at signal-receiving point 41 provides a circularly polarized excitation signal to patches 20 and 30.

Excitation points 42-45 are electrically connected to a common electrical ground potential. For example, excitation points 42-45 can be immediately adjacent to and disposed about a hole 48 in feed circuit 40 through which the above-described patch-and-circuit support 60 (FIG. 1) extends. Electrical and mechanical coupling of support 60 to feed circuit 40 at hole 48 (as well as to each of patches 20 and 30) can be achieved in a variety of solderless fashions (e.g., via threaded engagement) without departing from the scope of the present invention.

Figure 3:
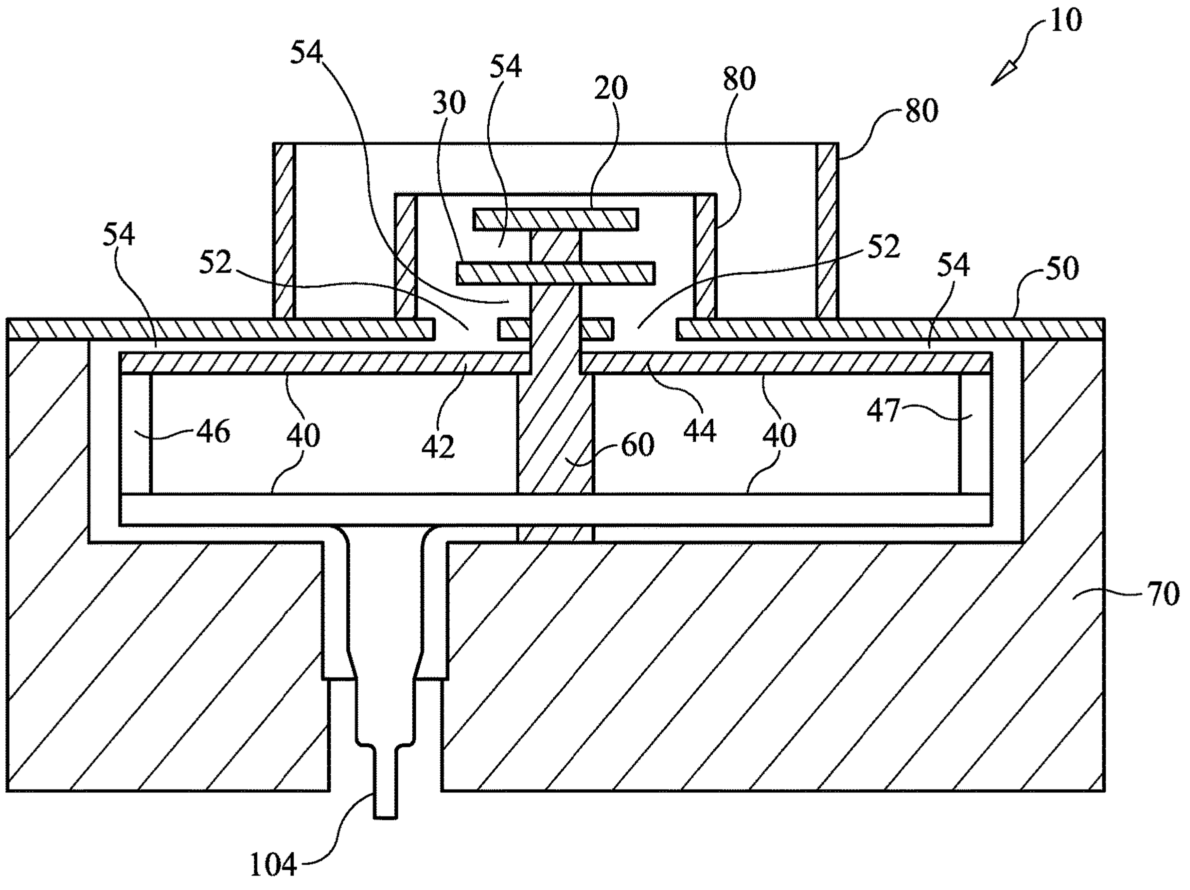
FIG. 3 is a cross-sectional view of a circularly polarized antenna to include a supporting structure and incorporating a cross-section of the feed circuit of FIG. 2 taken in a plane along line 3-3 in FIG. 2 in accordance with an embodiment of the present invention.
Figure 4:
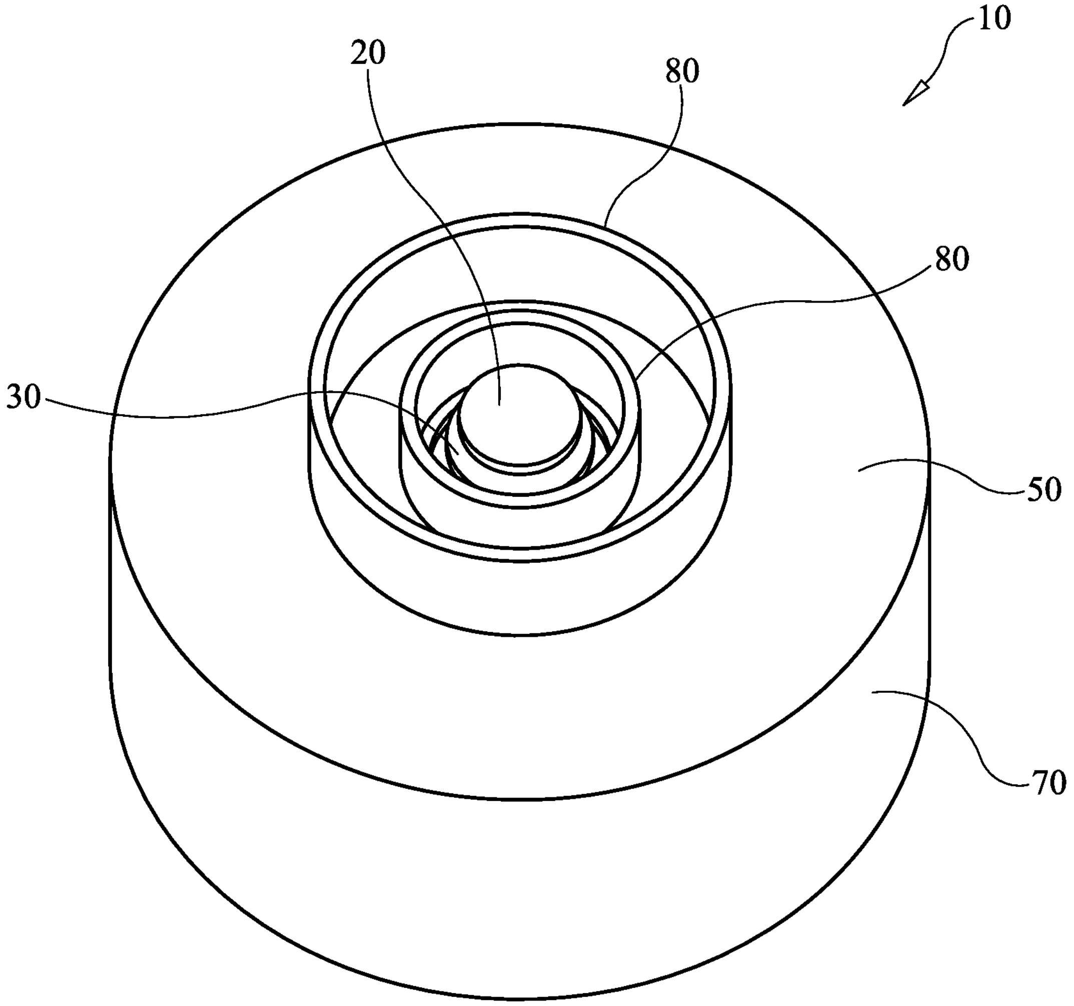
FIG. 4 is a perspective view of the circularly polarized antenna shown in FIG. 3.

As mentioned above, antenna 10 can be realized by a variety of non-limiting constructions. By way of example, a cross-sectional view of an embodiment of antenna 10 is shown in FIG. 3 and a perspective view thereof is shown in FIG. 4. In terms of feed circuit 40, the cross-section thereof is taken along a plane aligned with line 3-3 in FIG. 2. In this embodiment, antenna housing 70 encloses feed circuit 40, while patches 20/30 and choke rings 80 are located outside of antenna housing 70. Patch-and-circuit support 60 is a post providing both mechanical coupling of patches 20/30 and feed circuit 40 to antenna housing 70 as well as electrical coupling of patches 20/30 and feed circuit 40 to a common electrical ground potential.

The advantages of the present invention are numerous. The solderless antenna design is frequency-scalable via path length adjustments of the feed circuit. The solderless design avoids the damage pitfalls associated with conventional microstrip antennas.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An antenna, comprising:

a pair of disks spaced apart from one another and arranged in a vertical stack, each of said disks being electrically conductive; and a self-supporting, branched-path feed circuit spaced apart from said pair of said disks, said feed circuit having a signal-receiving point, a first signal path from said signal-receiving point to a first excitation point, a second signal path from said signal-receiving point to a second excitation point, said second signal path including a portion of said first signal path and being longer than said first signal path, a third signal path from said signal-receiving point to a third excitation point, said third signal path being unique with respect to said first signal path and said second signal path, said third signal path being longer than said second signal path, a fourth signal path from said signal-receiving point to a fourth excitation point, said fourth signal path including a portion of said third signal path and being longer than said third signal path, an electrically-conductive post coupled to said disks and said feed circuit for mechanical support of said vertical stack and for electrically grounding said disks and said feed circuit, and a ground partition, wherein said disks, and said feed circuit are disposed in one of an air environment and a vacuum environment wherein, when a microwave signal is adapted to be supplied to said signal receiving point, power of the microwave signal is equally divided and distributed firstly to said first excitation point, secondly to said second excitation point, thirdly to said third excitation point, and fourthly to said fourth excitation point, wherein each path segment traverses from its respective signal-receiving point to its respective excitation point via an impedance-matching transformer.

2. An antenna as in claim 1, wherein said feed circuit is non-planar.

3. An antenna as in claim 1, wherein said second path is λ/4 longer than said first path, said third path is λ/2 longer than said first path, and said fourth path is λ/4 longer than said third path, wherein λ is the wavelength of a frequency of the microwave signal.

4. An antenna as in claim 1, wherein a physical angle matches an electrical phase lag angle between each of said first excitation point, said second excitation point, said third excitation point, and said fourth excitation point.

5. An antenna as in claim 1, wherein said feed circuit is adapted to be coupled to a common electrical ground potential at each of said first excitation point, said second excitation point, said third excitation point, and said fourth excitation point.

6. An antenna as in claim 1, wherein said disks and said feed circuit are disposed in one of an air environment and a vacuum environment.

* * * * *